(12) United States Patent
Corredoura

(10) Patent No.: US 7,504,785 B2
(45) Date of Patent: Mar. 17, 2009

(54) SYSTEM FOR CONTROLLING AN ELECTROSTATIC STEPPER MOTOR

(75) Inventor: Paul Lewis Corredoura, Redwood City, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 470 days.

(21) Appl. No.: 11/223,846

(22) Filed: Sep. 9, 2005

(65) Prior Publication Data

US 2007/0057595 A1     Mar. 15, 2007

(51) Int. Cl.
*H02P 8/00*    (2006.01)
*H02N 1/00*    (2006.01)

(52) U.S. Cl. .................. 318/135; 310/68 B; 310/309; 318/400.04; 318/601

(58) Field of Classification Search .............. 310/242, 310/245, 248–249, 309; 318/135
See application file for complete search history.

(56) References Cited

U.S. PATENT DOCUMENTS

| | | | |
|---|---|---|---|
| 4,446,412 A * | 5/1984 | Friedman et al. ............ | 318/696 |
| 4,618,808 A | 10/1986 | Ish-Shalom et al. | |
| 5,621,294 A * | 4/1997 | Bessette et al. ............. | 318/701 |
| 6,208,107 B1 | 3/2001 | Maske et al. | |
| 6,285,155 B1 | 9/2001 | Maske et al. | |
| 6,404,154 B2 * | 6/2002 | Marcinkiewicz et al. ..................... | 318/400.07 |
| 6,445,961 B1 * | 9/2002 | Melvin ........................ | 700/32 |
| 6,525,446 B1 * | 2/2003 | Yasuda et al. ............... | 310/309 |
| 6,762,745 B1 * | 7/2004 | Braun et al. ................. | 345/156 |
| 6,922,025 B2 * | 7/2005 | Smith .......................... | 318/135 |
| 7,026,776 B1 * | 4/2006 | Walters ....................... | 318/434 |
| 2003/0117152 A1 | 6/2003 | Murphy | |
| 2003/0227268 A1 | 12/2003 | Smith | |

OTHER PUBLICATIONS

Hoen et al., "Electrostatic Surface Drives: Theoretical Considerations and Fabrication," Agilent Labs., 1997.
European Patent Office, Partial European Search Report, Jul. 30, 2008.

* cited by examiner

*Primary Examiner*—Burton Mullins

(57) ABSTRACT

A system to control the fixed mass/spring mechanical resonance of the motor in conjunction with a model of the motor that estimates the present position and allows the determination of the motor stator voltage pattern which will produce the requested output force. This approach effectively eliminates the electrical restoring force from the motor dynamics and minimizes the problems associated with the varying resonant frequency of the motor.

20 Claims, 8 Drawing Sheets

SYSTEM FOR CONTROLLING AN ELECTROSTATIC STEPPER MOTOR

TECHNICAL FIELD

The present invention generally relates to methods for motor control for a linear motion electrostatic motor but may apply to stepper motors in general. Linear motion electrostatic motors operate on stepper motor principles, i.e., they are driven by changing the voltage pattern on a set of control electrodes and allow precise control of linear motion. Changing the voltage pattern on the motor electrodes results in a known, precise change in the position of the motor after motion has stopped.

BACKGROUND AND SUMMARY OF THE INVENTION

Electrostatic stepper motors use a plurality of set voltage patterns to provide controlled incremental movements often referred to as steps. Changing the voltage pattern moves the stepper motor through those steps, or to a resting position at a particular step. Electrostatic stepper motors are controlled by setting a voltage pattern on an array of stator electrodes that interact with the fields on an array of translator electrodes to produce a force (and motion) on the translator stage. This force is a function of the voltage pattern and the relative position of the translator electrodes with respect to the stator electrodes. Electrostatic stepper motors can be built to produce linear or rotational motion. The present invention was developed for a linear electrostatic stepper and certainly applies to rotational electrostatic stepper motors but may apply to magnetic stepper motors (linear or rotational) as well.

To summarize the description provided above, the resulting motion (or force) from a change in the voltage pattern depends not only on the applied voltage pattern but also on the relative location of the translator electrodes with respect to the location of the stator electrodes. However, if the voltage pattern is changed before the motor comes to rest at the location consistent with the previous state, the relative position of the translator electrodes with respect to the stator electrodes won't be known. Many applications for stepper motors limit the rate of change of the applied voltage pattern to prevent the translator and the applied voltage pattern from getting too far out of phase and possibly slipping into the adjacent potential well. For applications that require the motor voltage pattern to change before the motion has stopped, the output force is a nonlinear function of the voltage pattern and the relative position of the translator and stator electrodes. The present invention effectively linearizes the response of the motor for use in control systems with bandwidths that don't allow the motor to stop before issuing a new voltage pattern to the motor.

A linearized electrostatic stepper motor accepts a force request from the system controller and calculates the required voltage pattern to produce the required force, regardless of the present position of the motor. This is achieved by modeling the dynamic state of the motor. The model can be augmented for improved accuracy by measuring the present motor position, but this is not a requirement.

A linear motion electrostatic stepper motor can be configured as shown in FIG. 1. The translator stage is supported by springs that allow horizontal motion while maintaining the desired vertical spacing. The translator electrodes are parallel to the stator electrodes, which are mounted on the fixed position stator stage below the movable translator stage. Semiconductor fabrication techniques can be used to build linear motion electrostatic stepper motors that are physically small and can provide swift, extremely accurate, controlled motion.

A voltage pattern is applied to both sets of electrodes to generate a spatially alternating electrostatic field on each surface of the two facing electrode sets. Typically the translator pattern is fixed and the stator pattern is varied to control the motor motion. For a more complete understanding of such drive voltage patterns and the forces generated by an electrostatic surface micro motor, please refer to *Electrostatic Surface Drives: Theoretical Considerations and Fabrication*, Storrs Hoen et al., Agilent Laboratories, Jun. 16, 1997, incorporated by reference herein in its entirety.

Typically stepper motors are controlled such that the motor position is the control reference and care is taken to ensure that the motor position never slips too far out of phase with the intended position. Such control can be achieved through the use of predetermined acceleration/deceleration curves. In the present invention the relative positions of the translator and the stator is modeled, allowing the calculation of the required voltage pattern that produces the desired force output.

Motor dynamics play an important role in design of a motor control system. The dynamics of the motor are determined by its mechanical properties (mass and spring constants) and the forces generated by the applied electric fields. The mass/spring dynamics form a resonance response. The electric fields from the electrodes significantly increase the frequency of the motor resonance by generating a force that tends to hold the translator in place (with respect to the stator electrodes).

These electrical forces are a function of the field strength (voltage) applied to the stator/translator electrodes and the motor phase, i.e., the relative position of the translator plate with respect to the electric field generated at the stator electrodes. One effect that may impact the effective field strength for electrostatic motors is dielectric charging. Areas of charge can build up (especially in the presence of water vapor) in the motor insulators, which effectively cancel a portion of the applied external electric field. This reduces the electrical restoring forces of the motor and lowers the resonant frequency of the energized motor. Building a closed loop feedback controller that can adapt to the changing motor response is a more challenging task than building a static controller, but the task is still possible. For a good discussion on the problems associated with motor resonances, see U.S. Pat. No. 6,208,107 entitled "Use of Digital Current Ramping to Reduce Audible Noise in Stepper Motor," to Maske et al., issued Mar. 27, 2001. Another patent that discusses motor resonances and provides a good technical discussion of stepper motors as well is U.S. Pat. No. 6,285,155 entitled "Pseudo Half-Step Motor Drive Method and Apparatus," to Maske et al., issued Sep. 4, 2001.

The present invention allows the use of a fixed feedback controller designed to control the fixed mass/spring mechanical resonance of the motor in conjunction with a model of the motor that estimates the present position and allows the determination of the motor stator voltage pattern which will produce the requested output force. This approach effectively eliminates the electrical restoring force from the motor dynamics and eliminates the problems associated with the varying resonant frequency (since the variations were caused by the electrical restoring force, not the mechanical properties of the motor). Typical prior art controllers for a stepper motor monitor position error and produce the motor voltage state consistent with the desired location. In the present invention the motor is viewed as a force actuator and not a positional actuator. Once the motor has been effectively linearized, standard techniques are used to design a feedback controller which monitors position and requests a force output from the motor.

The preferred method of determining motor position is to develop a mathematical model of motor characteristics and motor dynamics to estimate motor position. Adding an external sensor to the model would enhance the accuracy of the model's estimating capabilities by providing positional data via feedback. To enhance the ability of the estimator model to provide accurate positional data, non-linear effects, such as motor saturation, could be included in the model.

A preferred embodiment of the present invention is a system for controlling the position of a linear motion electrostatic motor in a closed loop feed back system, the system comprising means for determining the position of the motor, means for converting positional error into an output driving force request, and means for calculating the motor voltage pattern which will produce the requested force at the present motor position.

There are several methods for determining the present motor position. Dead reckoning can be used if the motor response is well modeled and if any external forces are small. Feedback can be used to enhance the accuracy of the estimated position, essentially adding the measured position (which may be noisy) to the estimator model. In cases where the measured position is not noisy, the directly measured position can replace the estimated position.

In another preferred embodiment of the present invention, to minimize the effect of resonant frequencies changes associated with the variation of the electrical restoring force of the stepper motor, a position sensor mounted on the motor generates a signal which relates to the actual position of the motor. The data provided by the position sensor is then transferred to an analog-to-digital converter, to be outputted from this converter as digital counts which are inputted to a position estimator which combines the present data with the past history and known dynamics to estimate the current position of the motor. The mechanical position data is then mapped into the appropriate motor voltage pattern. This electrical equivalent of the mechanical position component provides a motor state offset, which, when combined with the force request input to the motor to complete the linearization circuit, effectively removes the positional dependence from the motor state.

Another preferred embodiment of the present invention is a method for controlling the position of a linear motion electrostatic stepper motor in a closed loop feedback system, wherein output force requests are delivered to the motor in succession to move the motor from a first position to a second position, the method including the sensing a positional change of the motor following motor movement in said successive incremental steps, converting positional error into a requested output driving force, adding the output driving force with a positional offset provided by a mathematical model, and delivering the motor voltage pattern which will produce the desired force offset force provided by the comparing means to a means for combining the offset force with the input driving forces, thereby to remove the mechanical component of linear movement from the input driving forces.

DETAILED DESCRIPTION OF THE INVENTION

Figure 1:
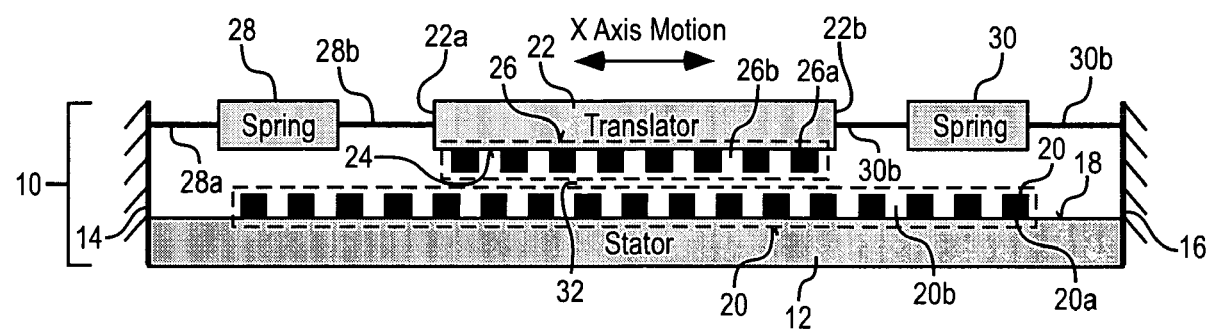
FIG. 1 schematically illustrates an exemplary linear motion electrostatic stepper motor with which the system of the present invention has been employed to allow the stepper motor to act as a precise force actuator, effectively removing the positional sensitivity from the motor response.

Before the invention is described in detail, it is to be understood that, unless otherwise indicated, this invention is not limited to a particular circuit or components thereof, as such may vary. It is also to be understood that the terminology used herein is for purposes of describing particular embodiments only, and is not intended to be limiting.

As used in the specification and the appended claims, the singular forms "a," "an" and "the" include plural referents unless the context clearly dictates otherwise. Thus, for example, reference to "a spring" includes a single spring as well as a plurality of springs; reference to "an electrode" includes a single electrode as well as multiple electrodes.

In this specification and in the claims that follow, reference will be made to a number of terms that shall be defined to have the following meanings, unless the context in which they are employed clearly indicates otherwise:

The term "micro motor" refers to a device having features of micron or submicron dimensions, and which can be used to provide any number of successive linear movements involving very small amounts of travel. The terms "micro motor," "linear motor," "electrostatic linear motion motor," "linear stepper motor", and comparable terms are used interchangeably throughout the text, and are used to describe a variant of the "stepper motor," defined below. In the linear stepper motor, the purpose is also incremental control of motor movement, with the movement controlled being linear along a defined x-axis rather being rotational about a fixed rotational axis.

"Optional" or "optionally" as used herein means that the subsequently described feature or structure may or may not be present, or that the subsequently described event or circumstance may or may not occur, and that the description includes instances where a particular feature or structure is present and instances where the feature or structure is absent, or instances where the event or circumstance occurs and instances where it does not. Mere reference to a feature, structure, event or circumstance as "optional," does not imply in any way whether the feature, structure, event or circumstance is be preferred.

The term "stepper motor" refers to a motor controllable in discrete incremental steps. More commonly, the stepper motor is associated with rotary motion, with a spinning rotor mounted within a stationary stator shell, with stationary stator electrodes mounted on the interior of the stator shell and extending inwardly to face complementary rotor electrodes mounted on the rotor secured to the motor shaft. Voltage patterns input to the stator and rotor electrodes induce rotation of the motor shaft, and these voltage patterns can be precisely controlled to cause the shaft to rotate the motor shaft in precisely controlled increments. Stepper motors are well known in the art and any treatise on small electric motors can provide substantial information on stepper motors and stepper motor control. The motor for which the present invention is designed is a variant of the traditional stepper motor, in which the stator and the rotor (here designated the translator) are linear elements, facing each other, each carrying complementary sets of electrodes, and designed for linear movement along a linear axis. In addition, most stepper motors use magnetic fields to generate the desired force or motion while the motor used to develop the present invention uses electrostatic fields to generate the desired force and motion.

The term "substantially" as in "substantially identical" is used herein to refer to items that have the same or nearly the same dimensions and/or properties such that corresponding dimensions and/or properties of the items do not differ by more than approximately 15%. Preferably, the corresponding dimensions and/or properties do not differ by more than 5% and optimally by not more than approximately 1%. For example, two springs are substantially identical in properties when the springs exhibit dimensions and properties within approximately 5% of each other. Other uses of the term "substantially" have an analogous meaning.

The term "symmetric" is used herein in its ordinary sense to refer to a correspondence on opposite sides of a line or plane or about a central point or an axis. Thus, for example, "symmetric motion" refers to the movement of an item in the same manner on opposite sides of a line or plane of symmetry or the movement of an item in the same manner relative to a central point or axis of symmetry. Similarly, "asymmetric motion" refers to the movement of an item in a different manner on opposite sides of a line or plane of symmetry or about a point or axis of symmetry. For example, when the position of a moving item is plotted against time, a sinusoidal, triangular, or square wave plot indicates symmetric movement, whereas a saw tooth wave plot indicates asymmetric movement.

The invention thus relates to a system and method for controlling a linear motion electrostatic stepper motor, the system of the present invention including means for inputting a requested motor output force in successive incremental pulses to the motor to move the motor in successive incremental steps from a first position to a second position, and the system further comprising means for estimating or sensing a positional change of the motor following movement between successive incremental steps, means for converting measured or mathematically estimated positional change into a motor state offset value, means for converting a positional error into a requested motor force (if the motor is used in a positional error based control loop), means for limiting the requested force to the maximum force the motor can produce, means for adding the limited force request to the motor state as a motor offset value, means for removing the integer number of motor periods from the previous sum (like the remainder or REM function) to produce the output motor electrode pattern, thereby to remove the positional component of linear movement from the output force produced by the motor.

A linear electrostatic micro motor comprises means for inputting an input driving force to the motor, a means for combining the input driving force with a motor state offset to generate a motor state, motor control digital-to-analog converters to convert the motor state into a motor electrode voltage pattern which incrementally drives the micro motor. A translator plate of the micro motor is typically resiliently mounted to enable linear reciprocating movement along a predetermined path between the sidewalls of the motor. Typically the resilient mountings comprise a pair of springs of like dimensions and like elastic properties, with one spring having a first end attached to a first side wall and an opposite end attached to the midpoint of one side of a translator plate, and the other spring having a first end attached the midpoint of the other side of the translator plate and its opposite end attached to an opposite side wall. Other plate/spring configurations are possible, see supra. The resilient mountings of the translator plate add a significant dynamic mechanical force component to the forces generated by the electrical input to the micro motor.

A system to minimize the effect of varying resonant frequencies associated with the electrical restoring forces of the linear movement of the micro motor comprises an optional position sensor mounted on the motor to generate data providing the actual position of the motor as a voltage output. The data provided by the position sensor is then transferred to an analog-to-digital converter, to be output from this converter as digital counts which are input to a position estimator which combines the positional data input with previous force outputs in a mathematical model of the motor mechanical properties to determine a better estimate of the position of the motor. The estimator is only useful if the position measurement is noisy or if the update rate of the measurements is insufficient to track the motor position. The mechanical position data is then mapped into the appropriate electrical state. This electrical equivalent of the mechanical position component provides a motor state offset, which, when combined with the force input to the motor to complete the motor linearization function, effectively removes the positional component of movement from the force output from the motor.

In precision linear micro motor applications, in which motor movement must be controlled at the μm level, it is particularly desirable to know motor position, and the ability of the system to estimate motor position accurately can be as important as the ability to precisely control the linear movement of the motor.

In the present invention, it would be desirable to produce the preferred output force of the motor over some limited range of force determined by the physical dimensions of the motor and the maximum applied voltage. If the present relative position of the rotor and stator electrodes were known, a voltage pattern could be determined which would produce such desired output force. Eliminating the dynamics associated with the electrostatic restoring forces from the system dynamics enables the motor to be used in systems controlled by a fixed linear controller. Thus the stepper motor becomes a very accurate force translator for use in wider bandwidth, closed loop applications, such as controlled micrometric movements.

FIG. 1 depicts a schematic representation of a linear electrostatic stepper motor which could incorporate the novel control system of the present invention. As with all figures referenced herein, in which like parts are referenced by like numerals, FIG. 1 is not necessarily to scale, and certain dimensions may be exaggerated for clarity of presentation. In FIG. 1 a linear electrostatic stepper motor 10 comprises a stator plate 12 rigidly mounted between sidewalls 14 and 16. Stator plate 12 comprises a rectangular plate of generally uniform thickness composed of a nonconductive material. Extending upwardly from an upper surface 18 of the stator plate 12 is a set of stator electrodes 20. Stator electrodes 20 comprise a series of equispaced electrically conductive bars 20a with spacings 20b mounted in generally parallel alignment on upper surface 18 of the stator plate 12.

Disposed above the stator plate 12, in generally parallel alignment therewith, is a translator plate 22. The translator plate 22 comprises a rectangular plate of generally uniform thickness composed of a nonconductive material. The translator plate 22 has opposite sidewalls 22a and 22b. Extending downwardly from a lower surface 24 of the translator plate 22 is a set of translator electrodes 26. Translator electrodes 26 comprise a series of equispaced conductive bars 26a mounted in generally parallel alignment on lower surface 24 of the translator plate 22. In the preferred embodiment as disclosed herein, a spacing 26b provided between adjacent translator electrodes 26a is slightly different than the comparable spacing 20b between the stator electrodes 20. The translator electrodes 26a are also generally equal in height.

The translator plate 26 is resiliently mounted to opposite sidewalls 14 and 16 by a resilient support or mounting comprising substantially equivalent springs 28 and 30. For purposes of simplicity, two springs 28 and 30 are schematically shown. In fact, to stabilize the translator plate 22, it may be desirable to provide two springs in generally parallel alignment on opposite ends of each side of plate 22, i.e. four springs in total, to be attached to respective side walls 14, 16. With reference to the springs 28 and 30, substantially equivalent means that the spring 28 is substantially similar in size and shape and elastic properties to the spring 30. Each of the springs 28, 30 has one end fastened to a sidewall and an opposite end to the translator plate 22. Specifically, end 28a of spring 28 is attached to side wall 14 and opposite end 28b is attached to side wall 22a of the translator stage 22. Similarly, end 30a of spring 30 is attached to side wall 16 and opposite end 30b is attached to side wall 22b of the translator stage 22. The stator plate 12 and the translator plate 22 are displaced from each other, and the translator plate 22 is resiliently mounted to enable linear movement of the translator plate 22 along an x-axis that is in general parallel alignment with the fixed longitudinal axis of the stator plate 12.

The stator plate 12 and the translator plate 22 are sufficiently displaced from each other so as to create a space 32 separating respective sets of stator electrodes 20 and translator electrodes 26.

In operation the linear electrostatic stepper motor 10 operates by moving the translator plate 22 relative to the stator plate 12. In order to move the translator plate relative to the stator plate 12, the voltages input to selected stator electrodes 20 and translator electrodes 26 are changed in a specific pattern in order to interact with the electric fields emanating from respective sets of electrodes 20, 26.

For example, the translator electrodes 26 can have their voltages set in a pattern where a first electrode 26a would be placed at an operating voltage such as 40 volts, the electrode adjacent to it would be grounded, the next electrode would be at 40 volts, and the remaining electrodes would have their voltages set in a similar manner. The stator electrodes 20, on the other hand, could have their voltages set in a pattern that is not quite alternating. For example, a first stator electrode 20a could be set to a high voltage, a second stator electrode immediately adjacent to the first could be set to a low voltage, a third stator electrode 20a adjacent to the second could be set to a high voltage, a fourth stator electrode 20a adjacent to the third could be set to a low voltage, adjacent fifth stator electrodes could be set to high voltage and the sixth could be a voltage between ground and the high voltage (one electrode in the pattern is typically used for micro-stepping) and a seventh adjacent stator electrode 20a could be set to a low voltage. This seven-electrode voltage pattern could then be repeated for all of the stator electrodes 20a in the electrostatic linear stepper motor 10.

In order to move the translator plate 22, the pattern of the voltages in the stator electrodes 20 is changed by increasing or decreasing the voltage on one or more of the stator electrodes 20. Such voltages changes alter the distribution of the electric fields present between the stator electrodes 20 and translator electrodes 26. Therefore, the attractive and repulsive forces between the stator electrodes 20 and translator electrodes 26 are also altered and the position of the translator plate 22 is changed until the forces (including any external loads) are balanced.

In other words, as the stator electrode 20 voltages are changed, new, low-energy potential regions are created where the forces generated by the electric fields balance the mechanical forces exerted on the translator plate 22 by the springs 28, 30. Hence, once the voltages of the stator electrodes 20 have been changed to a new pattern, the translator plate 22 repositions itself.

Figure 2:
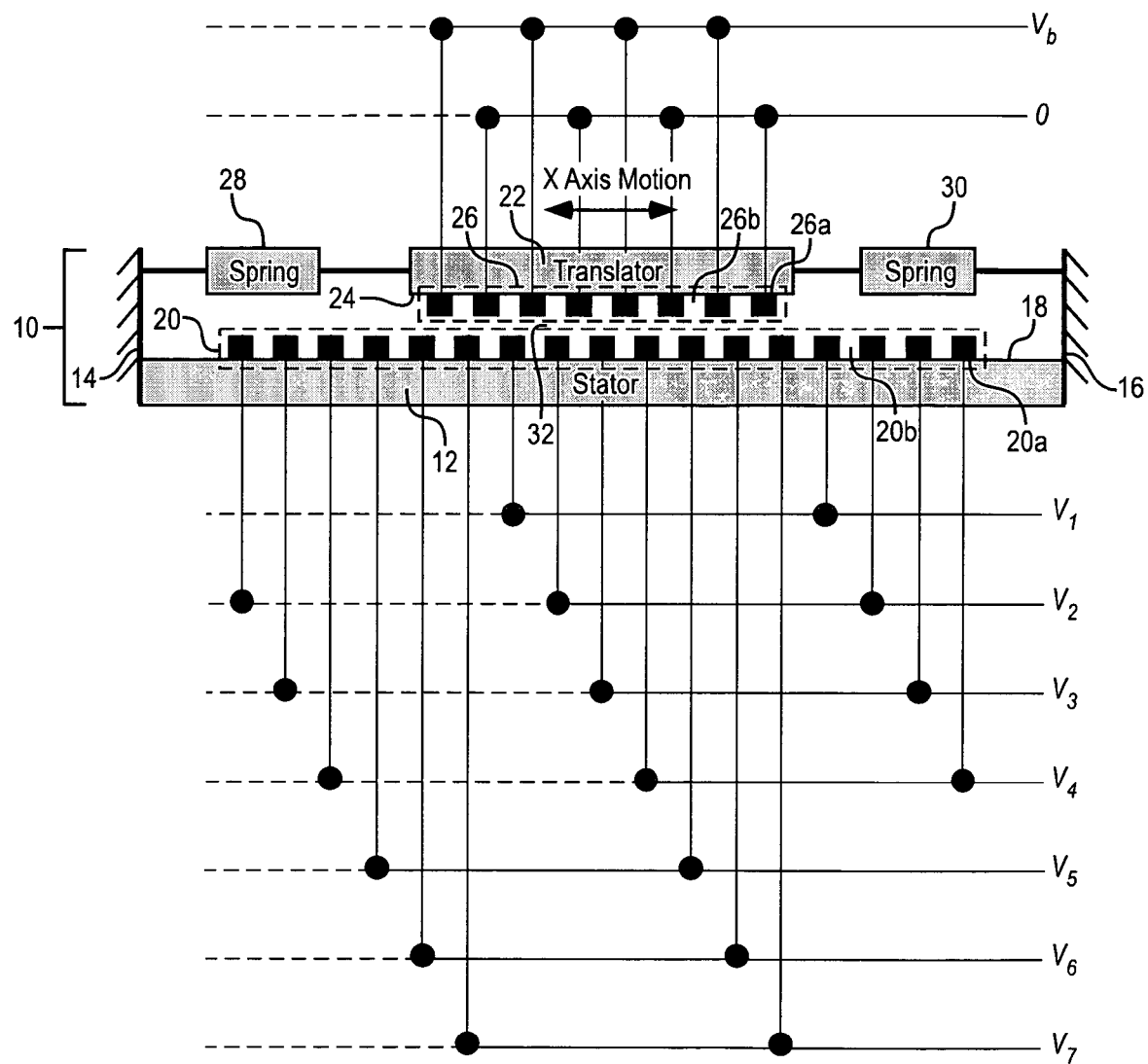
FIG. 2 schematically illustrates the voltage inputs to the electrodes of the electrostatic stepper motor of FIG. 1.

FIG. 2 is a schematic illustration of a means for supplying controlling voltages to electrodes 20, 26. The translator electrodes 26 alternate between $V_b$ and ground while a seven phase voltage pattern also varying between $V_b$ and ground, i.e., from $V_1$ to $V_7$, is applied to the stator electrodes 20.

An unwanted side effect of the electric fields is the out-of-plane component of the attractive forces between the stator electrodes 20 and the translator electrodes 26. These attractive forces pull the translator plate 22 towards the stator plate 12 and, if too great, allow the translator electrodes 26 and stator electrodes 20 to come into close enough contact that they electrically "short out" and fuse together. Such an event can cause catastrophic failure of the electrostatic linear stepper motor 10. While a detailed discussion of such an event can be found in the prior art, it is not included here because the solution to such a problem is not included in the present invention.

Although the springs 28, 30 are designed to be sufficiently stiff to restrict the out-of-plane movement of the translator plate 22, it is difficult (but possible) to fabricate a suspension as provided by springs 28, 30 that simultaneously provides the required in-plane mobility of the translator plate 22 and restricts out-of-plane motion.

The mechanical dynamics associated with the electrostatic linear stepper motor 10 can severely degrade motor performance. The resilient mounting of the translator plate 22 of the micro motor 10, which enables linear movement of the translator plate 22 along a predetermined path between the side walls of the micro motor 10, contributes mechanical dynamics to the movement of the linear stepper motor 10. That is, the voltage input received by the micro motor electrodes 20 and 26 delivers an output force that contributes an electrostatic component which moves the translator plate 22. Movement of the translator plate 22 by the voltage input voltage input to the micro motor 10 causes the springs 28, 30 to reposition. The dynamics of the system include the electrical restoring force and the dynamics associated with the mechanical components. In prior art applications the dynamics of the motor 10 are determined by the mechanical properties and the restoring forces associated with the applied electric fields. Any variation in the electrical restoring force would alter the system dynamics considerably.

Figure 3:
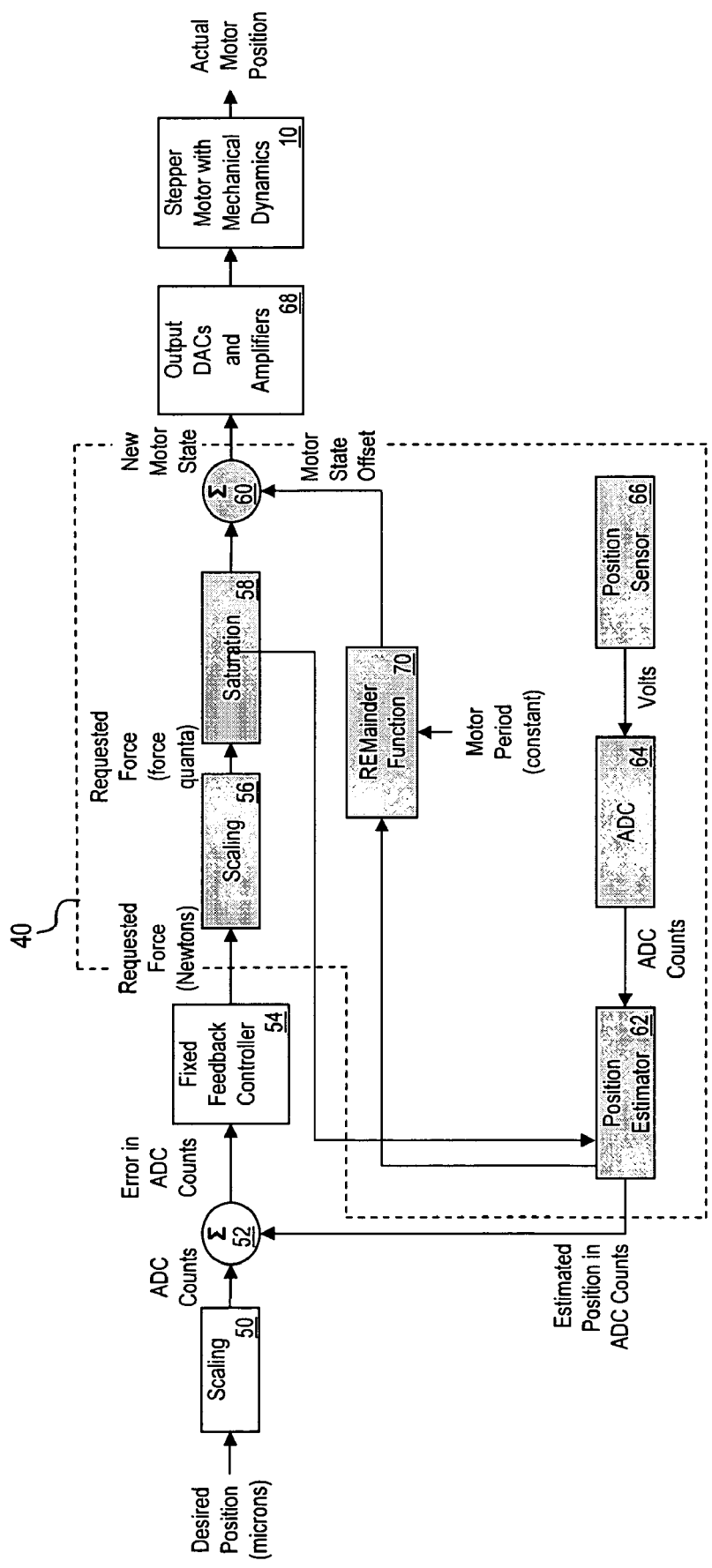
FIG. 3 is a block diagram of the major elements of a linear stepper motor control system constructed in accordance with one embodiment of the present invention.

FIG. 3 illustrates a typical application of the present invention wherein a linearization circuit 40 for linearizing an electrostatic linear stepper motor 10 receives force requests and provides the correct motor state necessary to produce the requested force, regardless of the present physical position of the motor translator plate 22 (shown in FIG. 2).

In the preferred application, the position of the stepper motor 10 is controlled in a closed loop feedback system which uses one form of the linearization circuit 40 of the present invention together with the micro motor 10 to form a linear force actuator.

The linearization circuit 40 receives force requests in Newtons from a feedback controller 54. Input to the feedback controller 54 is provided by a difference block 52, which receives information for the desired position from a scaling block 50 as well as information about the estimated position from a position estimator 62. The desired position request from the scaling block 50 is combined with the estimated position from the position estimator 62 in the difference block 52 to determine the present positional error.

All positional information is input to the difference block 52 as ADC counts. Information on the desired position is received by the scaling block 50 in microns and output as ADC counts. The output of the position estimator 62 is also in ADC counts.

The positional errors from the output of the difference block 52 to the feedback controller 54 will be processed by the linearization circuit 40 as set forth below.

The force requests from the feedback controller 54 are scaled into motor force quanta in the scaling block 56. A motor force quantum is defined as the amount of force the micro motor 10 will produce when the motor state is incremented by one microstep count (change of 1 DAC count on one DAC) from its zero force state at the current motor position. A saturation block 58 prevents the motor from trying to produce more force than it can actually generate. The output from the saturation block 58 is combined with the motor state offset at a summing block 60 to produce the new motor state which drives the motor digital-to-analog converters (DACs) 68. The DACs 68 and any associated amplifiers drive the electrostatic linear stepper motor 10.

The motor state offset is determined by the present position of the motor 10. In the preferred embodiment the position of the motor 10 is modeled in the position estimator 62. The position estimator 62 receives a measurement of the present position from a position sensor 66, such measurement being a digitized output from an analog-to-digital converter 64. The position estimator 62 also receives the previous saturated motor force requests from the saturation block 58. The position estimator 62 essentially models the mechanical dynamics of the motor 10. Adding the digitized output from the optional position sensor 66 enhances the accuracy of the model.

The output from the position estimator 62 drives a remainder or REM block 70. The remainder block 70 removes the periodic repetition from the position to determine the motor state or positional offset which is to be input to the summing block 60.

The effects of the linearization circuit 40 on mechanical resonances associated with a step voltage input to the micro motor 10 can be seen in FIGS. 4-8.

Figure 4:
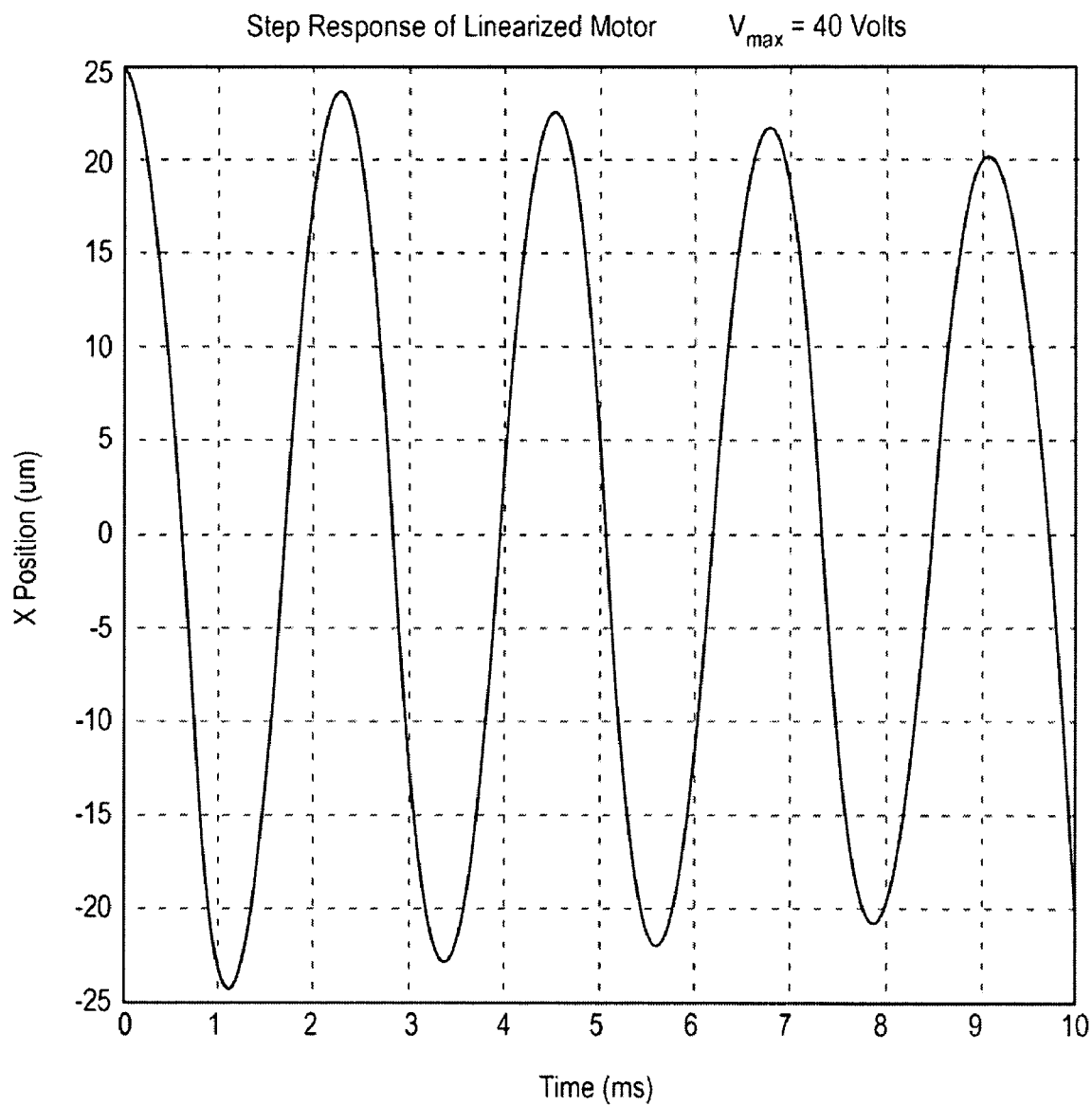
FIG. 4 shows the step response of a linearized electrostatic linear motion micro stepper motor with 40 volts peak electrode amplitude using a controller which employs the methods described by the present invention.

In FIG. 4, the step response of a linearized micro motor at 40 volts peak electrode amplitude is shown. In FIG. 4, the y-axis shows motor position in μm and the x-axis shows time in milliseconds to display the resonant frequency of the controlled motor. An alternating pattern of voltages is applied to the stator electrodes 20 and the translator electrodes 26. The pattern of voltages delivered to the stator electrodes 20 is altered to move the translator plate 22. The decaying oscillation pattern shown in FIG. 4 is related to the dynamics of the physical mass-spring motor characteristics, of the motor 10 of FIG. 3, not the electrical forces from the stator electrodes 20 and the translator electrodes 26.

Figure 5:
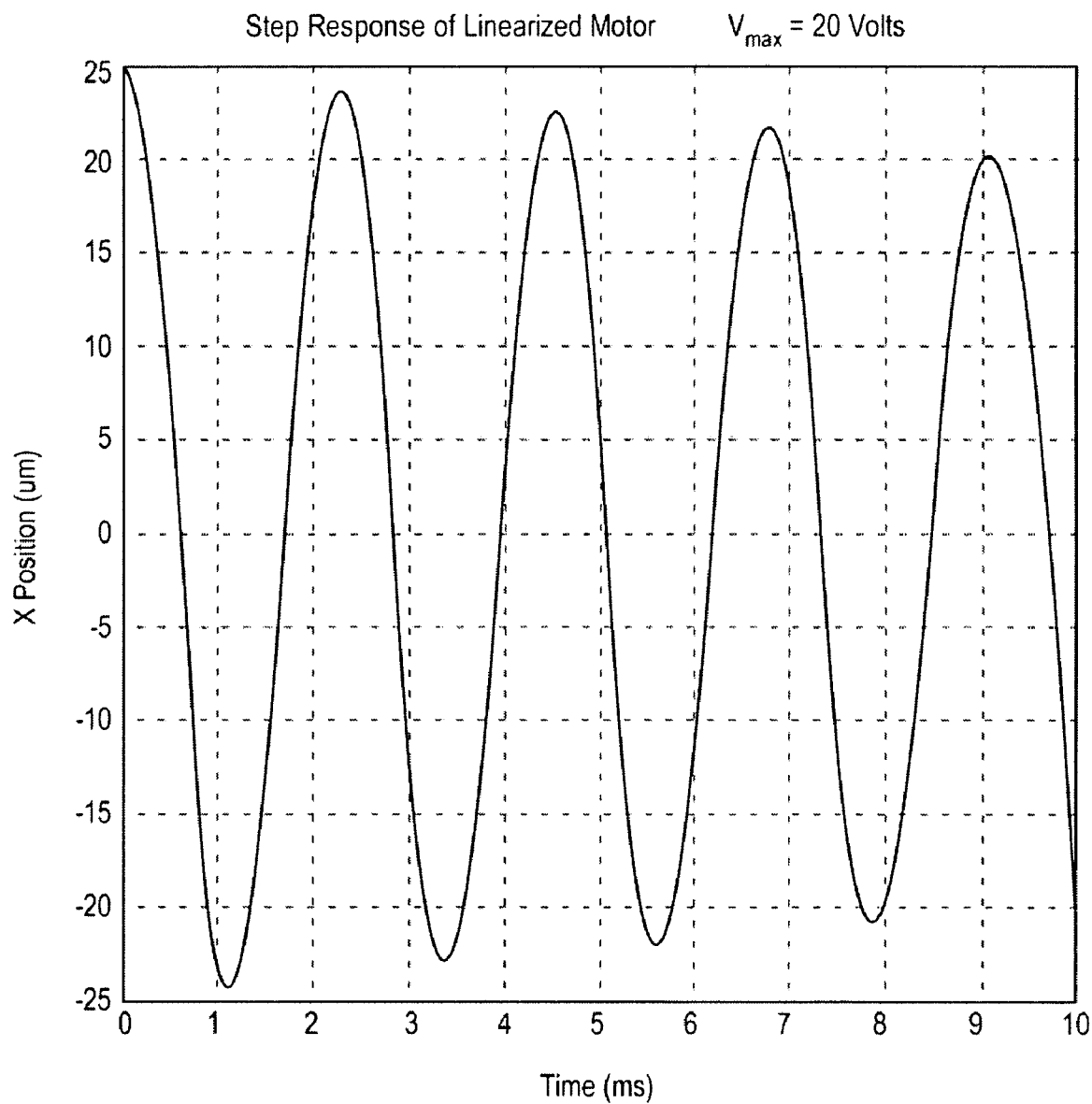
FIG. 5 shows the step response of a linearized electrostatic linear motion micro stepper motor with 20 volts peak electrode amplitude again using a controller which employs the methods described by this invention.

The simulation in FIG. 5 is similar to the simulation shown in FIG. 4 except that the peak electrode voltage has been reduced by half, to 20 volts. Even though the peak electrode voltage has been reduced by half compared to FIG. 4, the frequency and delay time are identical to that shown in FIG. 4. The motor linearization technique provided by the linearization circuit 40 has provided a dynamic digital motor state offset which effectively allows the null in the electrical restoring force to track the motor position, effectively eliminating the electrical restoring force from the system dynamics. Thus no electrical restoring force is produced as the voltage pattern on the stator electrodes 20 tracks the movement of the translator plate 22 through input to the translator electrodes 26.

Figure 6:
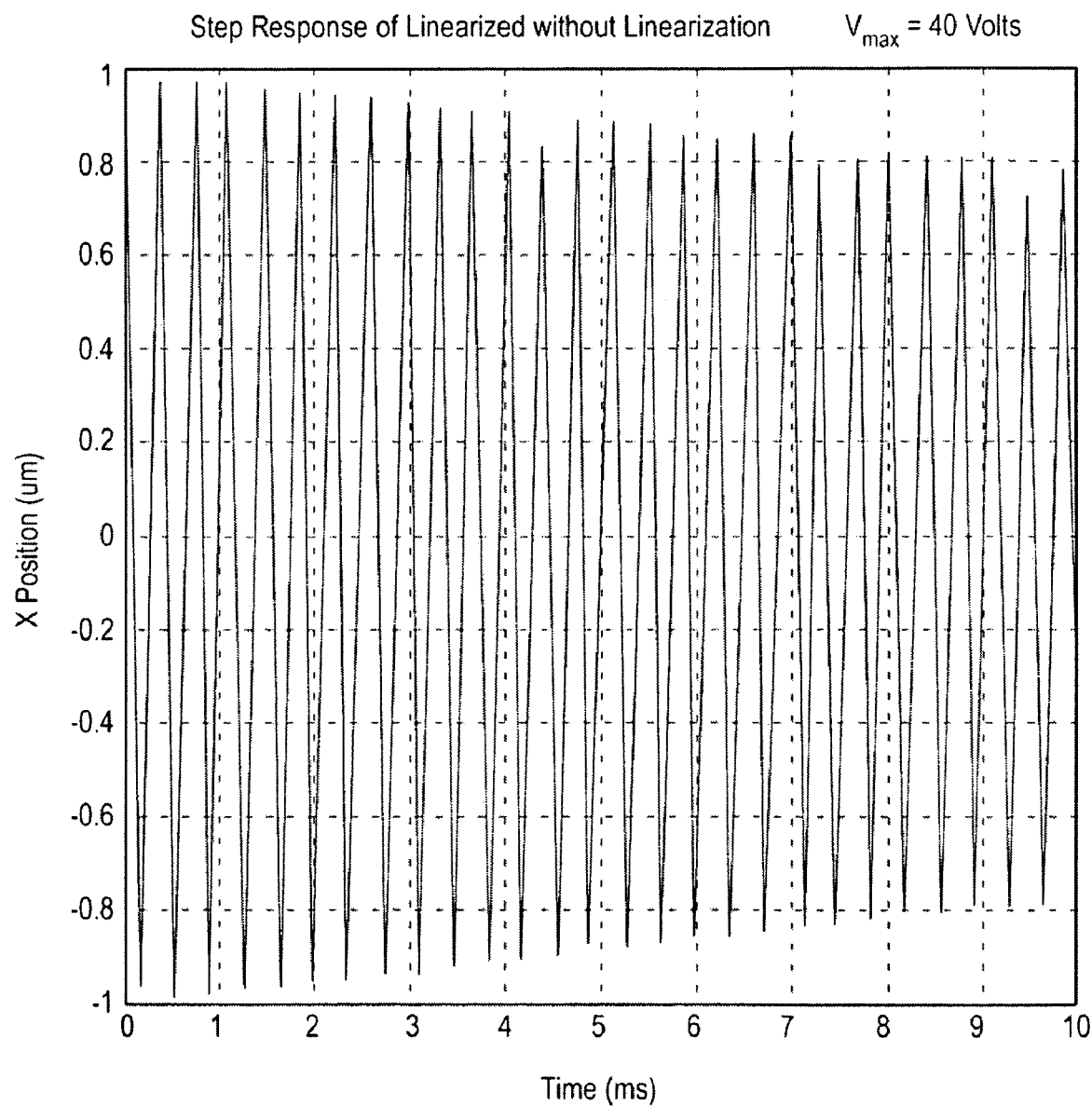
FIG. 6 shows the step response of an electrostatic linear motion micro stepper motor with no linearization and 40 volts peak electrode amplitude.

A third simulation as provided in FIG. 6 again shows the y-axis shows motor position in μm and the x-axis shows time in milliseconds to display frequency. However, the step response of the stepper motor 10 is shown with no linearization and the electrode potentials are fixed with a maximum voltage of 40 volts. A smaller initial offset is used to prevent the motion generated from exceeding the potential drop created by the electrical fields of the stator and translator electrodes 20, 26. Note that the frequency of the oscillations shown in FIG. 6 is much greater than the frequency of the oscillations shown in FIGS. 4 and 5, wherein the linearization provided by the linearization circuit 40 were used. This difference in frequency is due to the additional restoring force provided by the electric fields.

Figure 7:
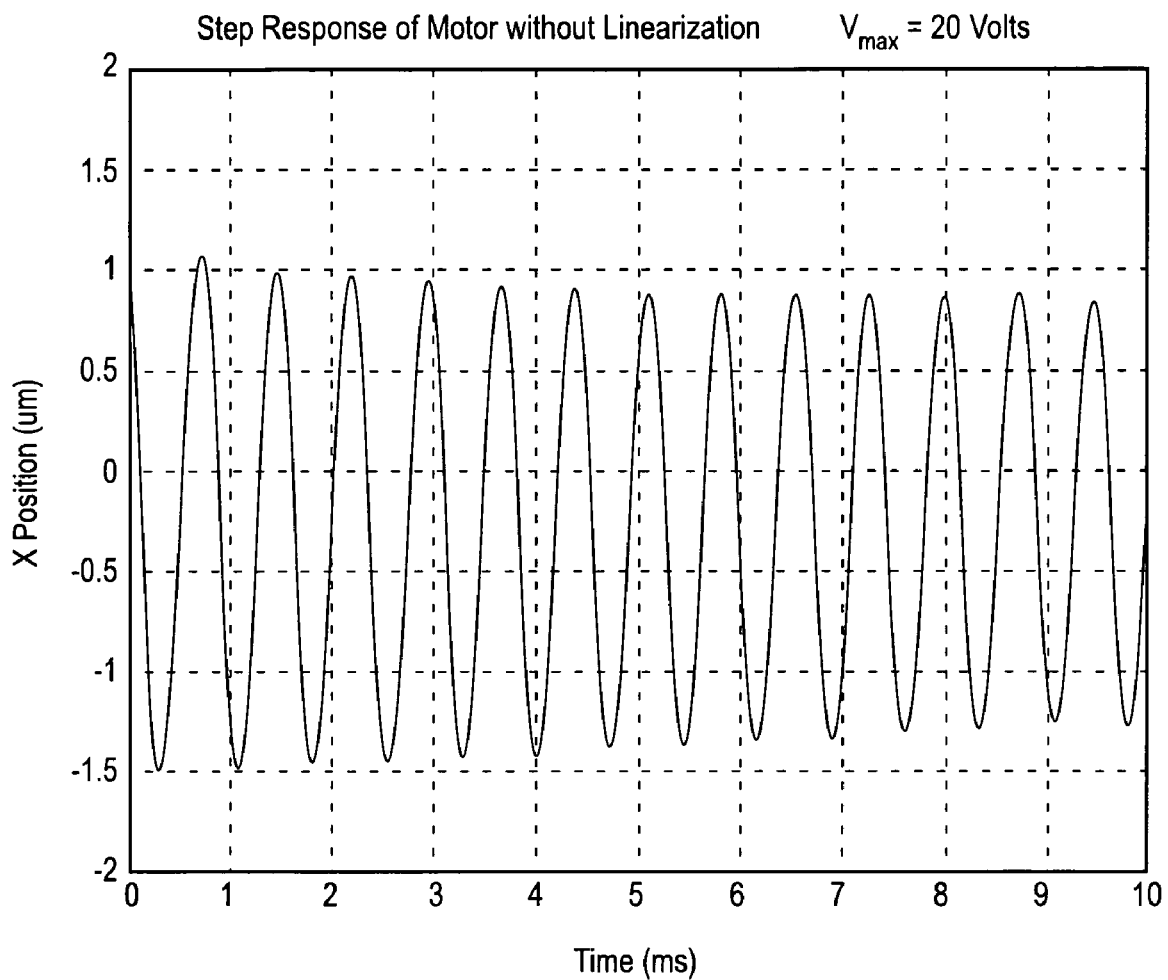
FIG. 7 shows the step response of electrostatic linear motion micro stepper motor with no linearization and 20 volts peak electrode amplitude. Note that the resonant frequency of the motor has changed dramatically between FIGS. 6 and 7 but not between FIGS. 4 and 5.

Note the dramatic change in resonant frequency shown in FIG. 7, a simulation similar to the simulation shown in FIG. 6, except that the peak electrode potentials have been reduced by half, from 40 volts to 20 volts. The simulation of FIG. 7 shows a substantial decrease in frequency. Although a decrease in amplitude is shown in FIG. 7, that change is not as dramatic because the scale for the y-axis in FIG. 6 is not the same as the scale for the y-axis in FIG. 6.

However the simulations shown in FIGS. 4-7 make it clear that the linearization circuit 40, which enables stepper motor linearization, prevents the electric restoring forces from affecting the motor dynamics and allows the micro motor 10 to act as a linear actuator in applications for closed-loop servo systems. In particular, note that the resonant frequency of the motor changed dramatically between FIGS. 6 and 7 but not between FIGS. 4 and 5.

Figure 8:
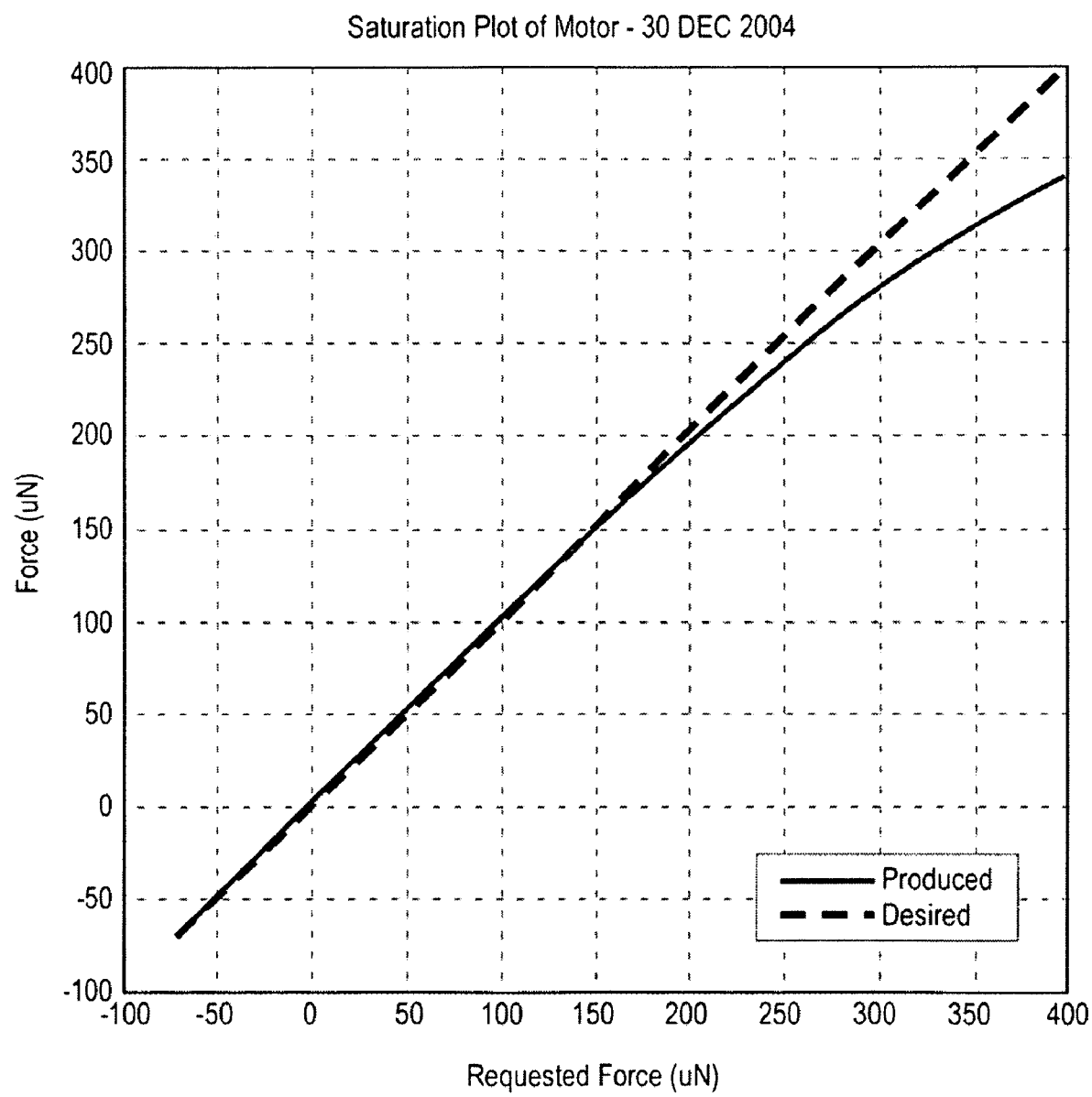
FIG. 8 shows a plot of the requested motor force against the delivered motor force taken while the motor is in motion.

In FIG. 8, the requested motor force (x-axis) is plotted against the delivered motor force (y-axis) for a system under motion employing the linearization method of the present invention. The force units plotted are micro-Newtons (μN). Although the plot shows a slight effect of motor saturation, overall the plot shows a linear response and demonstrates the viability of the motor linearization algorithm. This saturation effect can also be corrected for with a simple polynomial or look-up table. Although the plot shown in FIG. 8 could be corrected to minimize second order effects such as motor saturation and provide an even more linear response, for many applications the improvement may be negligible.

Because the present invention should not be limited to the specific system and method as set forth herein, the system and method of the present invention is generally described as a system and method for controlling the position of a stepper motor, the stepper motor using an input driving force in successive incremental pulses to the motor to move the motor in successive incremental steps from a first position to a second position, and the system comprising means for sensing or estimating a positional change of the motor following movement between successive incremental steps, means for converting such positional change into a linear output driving force, means for sensing the output driving force provided by the converting means, means for comparing the output driving force with a predetermined input driving force provided by a mathematical model, and means for generating an offset force provided by the comparing means to combine with the input driving force, thereby to remove the positional component of linear movement from the output forces of the motor.

Although the our discussion of the preferred embodiment is limited to its use in a linear configuration of a stepper micro motor, it is not difficult to envision its use in a rotary stepper motor, and it is reasonable to extend the present invention and its use to such an application. While FIG. 3 depicts one example of the inventive device, other features, types and configurations may be used as well.

It will be readily appreciated that although the control system has been presented in a one form, the inventive system can have a variety of structures. For example, the algorithm provided in the mathematical model may be modified to delete or incorporate secondary features associated with position control. For example, if dielectric charging does not have a significant impact on motor position, factors relating to it need not be incorporated into the model. Proper selection of system components may minimize noise in the control circuit to such an extent that it need not be factored into the model. Improvements in individual components of the control system are within the scope of the present invention.

It is to be understood that while the invention has been described in conjunction with the preferred specific embodiments thereof, the foregoing description is intended to illustrate and not limit the scope of the invention. Other aspects, advantages and modifications within the scope of the invention will be apparent to those skilled in the art to which the invention pertains.

All patents, patent applications, and publications mentioned herein are hereby incorporated by reference in their entireties.

I claim:

1. A system for linearizing the output of a stepper motor, the system comprising a controller providing force inputs to the motor, means for determining the position of the motor following movement between successive incremental steps, means for converting positional error into an output force request, means for converting measured positional change into a motor state offset value comprising an analog-to-digital converter configured to receive positional data provided to a position sensor, and means for calculating a motor voltage pattern which will produce the requested force at the present motor position.

2. The system as claimed in claim 1 wherein the stepper motor is an electrostatic linear motor.

3. The system as claimed in claim 1 wherein the stepper motor is an electrostatic linear micro motor.

4. The system as claimed in claim 1 wherein the stepper motor is an electrostatic surface drive motor.

5. The system as claimed in claim 1 including means to scale force requests from the controller into motor force quanta.

6. The system as claimed in claim 1 including a saturation block to prevent the motor from trying to produce more force than it can actually generate.

7. The system as claimed in claim 1 further comprises means for sensing a positional change comprises a position sensor mounted on the motor.

8. The system as claimed in claim 1 wherein a position estimator combines positional data from the controller with previous force outputs in a mathematical model of the motor mechanical properties to determine an estimate of the position of the motor.

9. The system as claimed in claim 8 wherein the mathematical model includes means for scaling and estimating motor state thereby to generate a motor state offset, to be provided for combining with the force input to the motor to complete the motor linearization function, effectively removing the positional component of movement from the force output from the motor.

10. A method for controlling a stepper motor wherein force requests are delivered to the motor in successive incremental pulses to move the motor in successive incremental steps from a first position to a second position, the method including the steps of sensing a positional change of the motor following motor movement between successive incremental steps, converting measured or mathematically estimated positional change into a motor state offset value, converting a positional error into a requested motor force, limiting the requested force to the maximum force the motor can produce, adding the limited force request to the motor state offset value, and removing the integer number of motor periods from the above sum to produce a output motor electrode pattern.

11. The method as claimed in claim 10 wherein said method is used to control an electrostatic linear motor.

12. The method as claimed in claim 10 wherein said method is used to control an electrostatic linear micro motor.

13. The method as claimed in claim 10 wherein the said method is used to control an electrostatic surface drive motor.

14. The method as claimed in claim 10 wherein said method is used in a closed loop feedback system.

15. The method as claimed in claim 10 wherein the sensing of the positional change is provided by a position sensor mounted on the motor.

16. The method as claimed in claim 10 wherein the conversion of positional change data into a motor state offset value is provided by an analog-to-digital converter which receives the positional data provided by the position sensor.

17. The method as claimed in claim 10 wherein the sensing of the motor state offset value provided from the analog-to-digital converter is provided by a position estimator which compares and evaluates the motor state offset value.

18. The method as claimed in claim 10 wherein the comparing of the motor state offset value includes the use of a mathematical model to provide a predetermined motor state offset value.

19. A system for controlling a linear motion electrostatic stepper motor, said system including means for inputting a requested motor output force in successive incremental pulses to the motor to move the motor in successive incremental steps from a first position to a second position, means for estimating or sensing a positional change of the motor following movement between successive incremental steps, means for converting measured or mathematically estimated positional change into a motor state offset value, means for converting a positional error into a requested motor force, means for limiting the requested force to the maximum force the motor can produce, means for adding the limited force request to the motor state as a motor offset value, means for removing the integer number of motor periods from the previous sum to produce the output motor electrode pattern.

20. A method for controlling a linear motion electrostatic stepper motor, said method including the steps of inputting a requested motor output force in successive incremental pulses to the motor to move the motor in successive incremental steps from a first position to a second position, estimating or sensing a positional change of the motor following movement between successive incremental steps, converting measured or mathematically estimated positional change into a motor state offset value, converting a positional error into a requested motor force, limiting the requested force to the maximum force the motor can produce, adding the limited force request to the motor state as a motor offset value, removing the integer number of motor periods from the previous sum to produce the output motor electrode pattern.

* * * * *